United States Patent
Moran

(10) Patent No.: US 7,653,013 B1
(45) Date of Patent: Jan. 26, 2010

(54) CONFERENCING SYSTEMS WITH ENHANCED CAPABILITIES

(75) Inventor: Thomas Moran, Kingstion (IE)

(73) Assignee: Nortel Networks Limited, St. Laurent, Quebec (CA)

( * ) Notice: Subject to any disclaimer, the term of this patent is extended or adjusted under 35 U.S.C. 154(b) by 1389 days.

(21) Appl. No.: 09/585,669

(22) Filed: Jun. 1, 2000

(51) Int. Cl.
*H04L 12/16* (2006.01)

(52) U.S. Cl. .................. 370/261; 370/260; 379/158

(58) Field of Classification Search ......... 370/260–262, 370/264; 379/158; 709/204, 205
See application file for complete search history.

(56) References Cited

U.S. PATENT DOCUMENTS

| | | | | |
|---|---|---|---|---|
| 5,473,605 | A | * | 12/1995 | Grube et al. ............... 370/261 |
| 5,483,588 | A | * | 1/1996 | Eaton et al. ............ 379/202.01 |
| 5,689,553 | A | * | 11/1997 | Ahuja et al. ........... 379/202.01 |
| 5,729,687 | A | * | 3/1998 | Rothrock et al. ............ 709/204 |
| 5,812,865 | A | * | 9/1998 | Theimer et al. ............. 709/228 |
| 5,842,136 | A | * | 11/1998 | Tuulos ....................... 455/519 |
| 5,886,734 | A | * | 3/1999 | Ozone et al. ............. 348/14.09 |
| 5,916,302 | A | * | 6/1999 | Dunn et al. ................. 709/204 |
| 6,178,237 | B1 | * | 1/2001 | Horn ..................... 379/202.01 |
| 6,236,854 | B1 | * | 5/2001 | Bradshaw, Jr. .............. 455/416 |
| 6,404,873 | B1 | * | 6/2002 | Beyda et al. ........... 379/202.01 |
| 6,757,259 | B1 | * | 6/2004 | Hamilton .................... 370/260 |

FOREIGN PATENT DOCUMENTS

EP          604053 A1 *   6/1994

OTHER PUBLICATIONS

Horn, D.N. et al. "A Versatile Audio Bridge for Multimedia Conferencing". IEEE International Conference on Communications, 1994. ICC 94, SUPERCOMM. New Orleans, LA. May 1-5, 1994. vol. 3. pp. 1754-1762.*

* cited by examiner

*Primary Examiner*—Donald Mills
(74) *Attorney, Agent, or Firm*—Barnes & Thornburg LLP

(57) ABSTRACT

A method of conferencing involves forming a main conference between a plurality of users, providing a user with an option to request a subconference with a subset of other users, forming a subconference between said user and the subset of other users, and at least partially removing those users in the subconference from the main conference during the subsistence of the subconference. The conference is preferably a multimedia conference and the subconference can be conducted in an arbitrary mix of one or more of the media used in the main conference. Subconference participants have the option of monitoring proceedings in the main conference by receiving some of the main conference media signals while the subconference is in progress. The invention also provides conference servers, terminals and software for use in the subconferencing method.

22 Claims, 5 Drawing Sheets

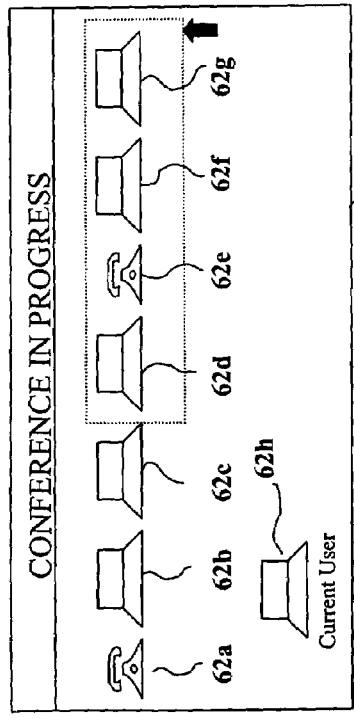

CONFERENCING SYSTEMS WITH ENHANCED CAPABILITIES

FIELD OF THE INVENTION

The present invention relates to conferencing systems.

BACKGROUND OF THE INVENTION

In a typical multimedia conferencing facility, a conference server includes a conference bridge having a number of ports to which participants can connect (e.g. by dialing up over an ISDN line or over the Internet).

Typically each participant will have a multimedia terminal which might include a video camera, display unit (such as a computer monitor), microphone and loudspeaker (e.g. as part of a telephone set connected to the terminal), and data transmission equipment (such as a computer to allow for applications such as file transfers, database access, electronic whiteboards), all connected to the ISDN line or the Internet.

Each participant connects to a port of the bridge and the conference server establishes the communications protocols to enable exchange of signals. Once the conference is underway, the conference server receives the multimedia stream from each participant, separates the channels from each stream, mixes the signals as appropriate and generates a return media stream to each participant.

Each participant will typically be sending a number of channels or streams of information to the conference server, such as video, audio, data, and control signals. The conference server receives the various video signals and may select the signal of one party to be sent as an outgoing signal to all of the parties, or it may perform a more sophisticated mixing operation on the signals, such as selecting a "current" signal, and combining this with the signals from the three most recent "current" signals, to generate a composite signal including the presence of the four most recent speakers, including the current speaker. Alternatively, and depending on the number of participants and available processing power, a composite signal of all participants may be generated by the server and broadcast to each port.

The incoming audio streams may be similarly decoded, mixed and re-encoded as a composite signal, or a single audio stream may be broadcast to all parties (i.e. the audio signal corresponding to the "current" video image).

In addition to decoding, mixing, and generating audio and video signals, the conference server will handle data streams, such as file exchanges, and whiteboard messages.

The conference server, in conjunction with a call server, also manages the connections of the participants to the conference, which involves establishing communications protocols, maintaining a listing of the participants' addresses and aliases (the address will typically be the Internet address, while the alias may be an email address or a name which is more user friendly. Communication at this level is achieved by a relatively low bandwidth control channel or stream.

Not all of the media streams need be present: thus it is possible to have audio and video channels only to and from each port, without a separate data channel, or the video channel may be omitted and an audio/data conference may be held. If some or all of the users are not computer-based, they may have telephones with display screens capable of displaying a reasonable amount of information, at least in text form. In such systems, the server can be arranged to provide each user with a listing of the users to the conference, over the control channels to the user, with that listing being displayed on the display screens of the users.

The server may be combined with and incorporated in a switching system such as a telephone exchange or its multimedia equivalent or extension. Alternatively, the server may be coupled to but distinct from such a standard switching system, with the switching system recognising the control signals indicating a conference call request and coupling the caller to the server for subsequent processing of the call.

Among the objects of the invention are the provision of a conference call server with enhanced capabilities, and the provision of an improved method of conferencing.

SUMMARY OF THE INVENTION

The invention provides a method of conferencing. This method involves (i) forming a main conference between a number of users or participants, (ii) providing a user with an option to request a subconference with some of the other users, (iii) forming a subconference between the user who requested the subconference and the subset of other users, and (iv) at least partially removing those users in the subconference from the main conference while the subconference lasts.

A conference call (whether in audio, video, or both) can be regarded as a simulation of a real physical meeting at which all the participants are physically present. However, there is considerably more flexibility at a real meeting. For example, it is possible for some of the participants to form a private sub-group in which a point can be discussed privately without the other participants in the main meeting being involved, or participants in the conference can pass notes to one another.

In a sense, these sub-groups can be regarded as subconferences which are "off-line" as far as the main conference is concerned. The invention simulates this behaviour in a conference scenario, by enabling users to request sub-meetings with some of the others present, to allow discussion of points privately using one or more media.

The invention is particularly useful where the main conference employs a plurality of media types (such as video, audio and data), allowing users in the subconference to utilise one, some or all of these media types for the subconference, and users in the subconference can actively or passively participate in the main conference in at least one media type during the subsistence of the subconference.

The mix of media types in the subconference and the choice of media (if any) used to maintain a presence in the main conference is entirely arbitrary and can be at the choice of the participants.

For example, video and audio may be used continuously by the main conference participants, with the option of data exchanges also available. A user could then initiate a subconference in data format only, so that text messages or files could be sent between the subconference participants but not be seen by the main conference participants. In terms of video and audio signals, the subconference participants would remain active in the main conference, but they would be partially removed from the main conference in the sense that their data exchanges would be private.

A further option could arise in the full multimedia type of conference, where some participants take part in a subconference using video, audio and data exchange, all of which would be private. In such cases, there might be the option of the subconference participants monitoring proceedings in the main conference by continuing to receive the audio streams from the main conference, or of having the main conference video images presented to subconference participants in a window on the screen. In this way the current speaker in the main conference would be visible or audible, and the users could rejoin when a particular speaker begins or when a particular point is raised in the discussion.

So one option is that the users in the subconference may be prevented (at their own option) from contributing to the main conference but remain able to monitor communications in the main conference during the subconference.

Another is to allow those users in the subconference to become entirely isolated from participation in the main conference during the subconference.

Again, these options give users the flexibility they would have at a real meeting, where people can leave the room, whisper to one another, pass notes, or move away from the meeting while monitoring the current speaker.

The invention can be put into practice by presenting the users in the main conference with a list of the main conference participants (e.g. on their telephone display or computer monitor), and allowing a user to request a subconference by selecting participants from the list using the computer terminal interface or telephone handset. The users in the subconference may then have a separate list presented to them so that they can see who else is in the subconference.

The subconference list may be "published", i.e. presented to the main conference users, or it may be maintained secret, so that the other users are unaware of the existence of the subconference, depending on the situation. Some ways of indicating that users are in a subconference would be to highlight, "grey out", or add a symbol to the names of the subconference participants in the main conference list. The sophistication of the display will depend on the display capabilities of the terminals involved.

Preferably, the subset of user(s) to whom the request is initially addressed will have the option of accepting or refusing to join the subconference, and this acceptance or rejection determines whether or not each user remains as part of the subset referred to above.

If the subconference list is published to the main conference participants, then the latter may have the option of requesting to join the subconference, and this request can be accepted or rejected by those in the subconference, or possibly at the sole discretion of the originator of the subconference.

Furthermore, each user in the subconference will preferably have the option of leaving the subconference at any time during the subsistence of the subconference. They may then be automatically returned to full participation in the main conference.

In an added degree of sophistication, users in the subconference may be presented with the option of requesting one or more of the other subconference users to join a "nested" subconference within the initial subconference. This can continue recursively, in theory, so that users in this sub-subconference can in turn request a smaller meeting. An example of the utility of this function would be where a conference occurs between representatives of two or more organisations. For many reasons, the users belonging to one team or organisation may have a private subconference, and at some point during this subconference, the senior members of the team might wish to arrive at a decision privately, in which case they could initiate a nested subconference.

Another optional degree of sophistication could be provided by allowing a user in the subconference to initiate a new subconference with one or more users from either the main conference or the subconference, without actually rejoining the main conference.

A further alternative is the option of allowing either conference users or those in a subconference to request the participation of external parties. This can be done by having the conference server dial up the new parties, and dynamically add them to the conference or subconference.

The creation and/or dissolution of the subconference can be specified in advance of the time of creation or dissolution. For example, in a large conference to which users have signed up in advance, the conference server may be instructed in advance to create e.g. three subconferences at an appointed time, and to return the participants in these subconferences to the main conference at a later time. This corresponds to the real-life scenario of a conference splitting into smaller meetings or workshops for a specified time. Participants in the conference would preferably specify in advance the subconference which they intended to join, or at the time of the subconference being initiated, users could be presented with the option of joining a particular subconference.

In another aspect the invention provides a conferencing server having the following components:

i) a main conference list memory unit for maintaining a list of the users connected to the server as part of a conference, ii) a main signal processing unit for receiving incoming signals from the conference participants, processing these signals and generating outgoing signals which are sent back to the users, iii) a main control unit for controlling both the main memory unit and the main signal processing unit, iv) a subconference list memory unit for maintaining a list of a subset of the conference participants, i.e. a list of participants taking part in a subconference, v) a subconference signal processing unit for generating outgoing signals to the subconference participants, such that the signals generated by the subconference processing unit include subconference-specific signals which are not included in the signals sent to users who are not participating in the subconference, and vi) a subconference control unit for controlling both the subconference memory unit and the subconference signal processing unit.

In effect, therefore, the conferencing server of the present invention has an added degree of sophistication relative to conventional servers by being able to run subconferences of participants from the main conference, while the main conference is simultaneously maintained. Of course, preferably two or more subconferences can be run at the same time.

It is preferred that the resources of the main conference side of the server are used in the sub-conferencing functions, and this allows for existing conference servers and their controlling software to be modified more easily to support subconferencing according to the invention.

Thus, for example, the main conference list memory unit and the subconference list memory unit can be logical areas within a single memory unit.

Similarly, the functions of the main signal processing means and of the subconference signal processing means are carried out by the same signal processing unit.

The signal processing unit is preferably adapted to combine signals of different media types, such as video, audio and data.

It is preferred that the signal processing unit should be dynamically programmable to generate outgoing signal streams containing an arbitrary combination of media types selected from the incoming signals from the users. In this way, the subconference can be tailored not only to a user-selected group of participants, but also to the best combination of media for the sub-conference.

The main control unit can include means for forwarding the list of users in the conference to each of the participants, to be displayed, for example on the handset or computer screen of each user. The users can then use this information to select subconference participants.

Suppose that one user, user A, wants to set up a subconference with another user, user B. To achieve this, user A selects, from his display unit, user B, and sends to the server a subconference request signal identifying user B. This can be done using a software command on a desktop computer terminal, or a keypress combination on a telephone handset. The server sends the subconference request signal to user B, together with the identity of user A, and the subconference request is displayed on user B's display unit. If user B accepts the request, then the server effectively removes users A and B from the main conference and sets up a private subconference for them.

In a further preferred feature, the subconference control unit has means for forwarding the list of subconference participants to the subconference participants, and optionally to all of the main conference participants also.

The concept of the invention is scaleable over several conference servers, all interlinked and viewed as a single resource during the conference. Any arbitrary subconference can be constructed from the users sharing this resource.

Preferably the signal processing units are part of a conference bridge having ports through which the incoming signals and outgoing signals enter and leave the bridge. A preferred example is a video conferencing bridge having multiple ports, which runs on software having the added functionality required to allow subconferences.

The invention also encompasses a conferencing system comprising a conferencing server, a call server connected to the conferencing server, and means for connecting users to the call server. The connection means can be e.g. a local area network to which users connect, an intranet or the Internet.

As most implementations will be software-enabled, the invention provides, in a further aspect, a computer program product containing software in machine readable form for managing a conference. The software, in operation, generates and maintains a list of participants in a main conference. It provides a participant with an option to request a subconference with a subset of other users in the list, and when this option is selected and other users accept the request, the software will form a list of participants in the subconference. As the software manages the conference, it will also at least partially remove the subconference participants from the main conference while the subconference lasts.

When the main conference is a multimedia conference, the software will preferably not only provide users with the option to request a subconference, but will also allow the requesting user to select one or more of the media for use during the subconference. This feature allows the user to remain in the main conference in the other media.

The invention also provides software for managing a conference, which can form a main conference between a number of users, provide a user with an option to request a subconference with a subset of other users, form a subconference between the user and the subset of other users, and at least partially remove those users in the subconference from the main conference during the subsistence of the subconference.

The invention also provides software for enabling a user at a terminal to participate in a conference. This software presents an identification of participants in the conference, enables the user to generate a request for a subconference, and forwards the request to a conference server to which the terminal is connected.

Preferably, this software also allows the user to select one or more media types for use during the subconference. Optionally, it also allows the users in the subconference to select full duplex or half duplex communications with the main conference in one or more media.

Half duplex communication can be in either direction, i.e. in the case of half duplex video, the main conference video proceedings could be broadcast to the participants in the sub-conference without a return video stream being broadcast to the main conference participants, or vice versa.

In a further aspect, the invention provides a terminal for use in a conference, having a display unit for displaying the list of conference participants, input means for enabling a user to generating a subconference request with one or more of the main conference participants, and means for forwarding this request to a conference server.

As noted above, this terminal may be a telephone handset with the required display and input capabilities, and having the necessary functionality to generate and forward the subconference request (either as a feature of software loaded on the handset or as a hardware feature, or it may be a multimedia terminal such as a PC having multimedia capabilities.

In the case where the conference is a simple telephone conference, or where all of the subconference participants are limited to telephone connections only, the subconference request simply identifies the desired participants in the subconference and optionally, specifies whether the main conference proceedings are to be received by the subconference participants.

BRIEF LIST OF DRAWINGS

The invention will now be described, by way of example and with references to the drawings, in which.

Figure 3:
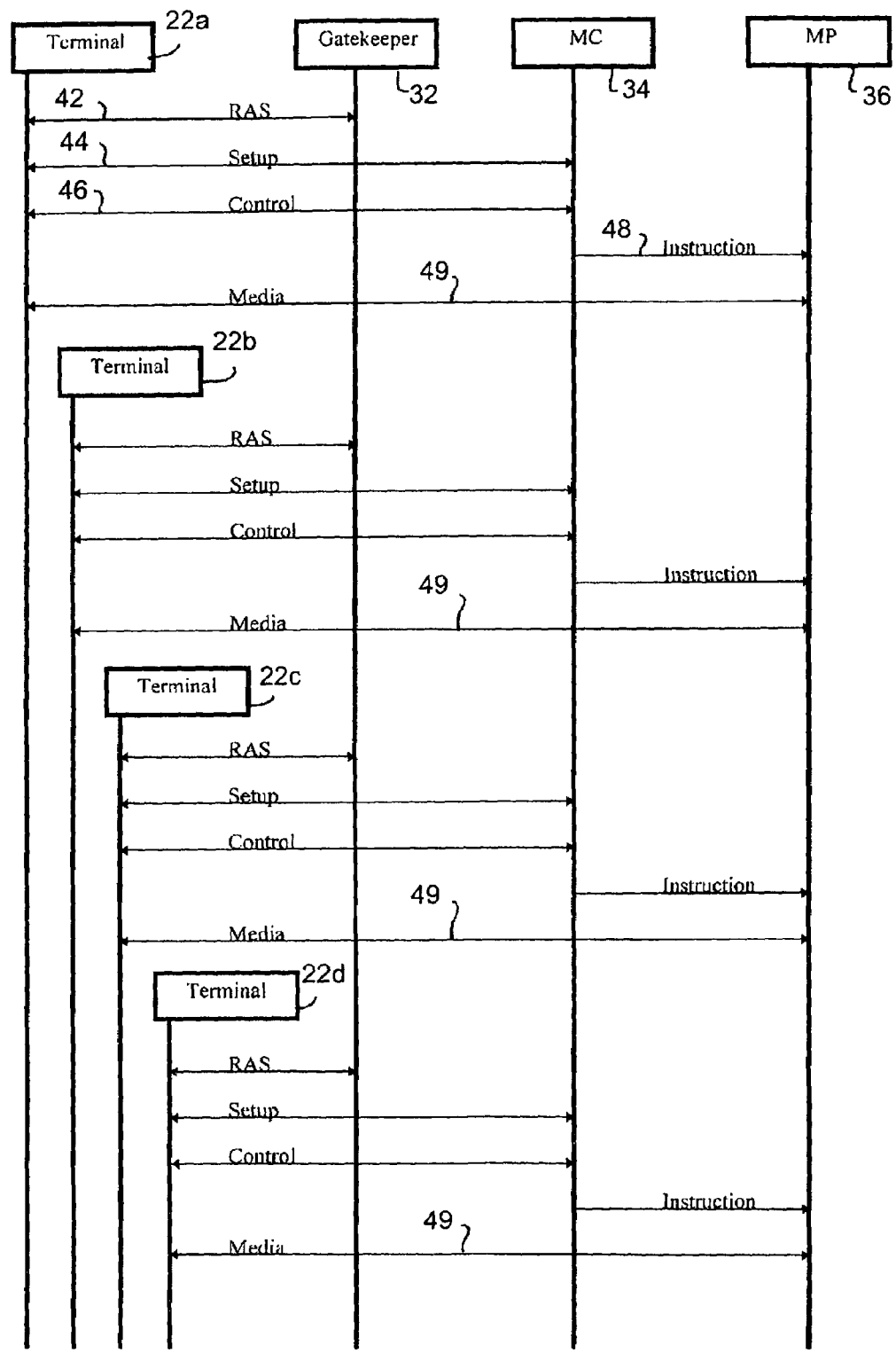
Figure 4:
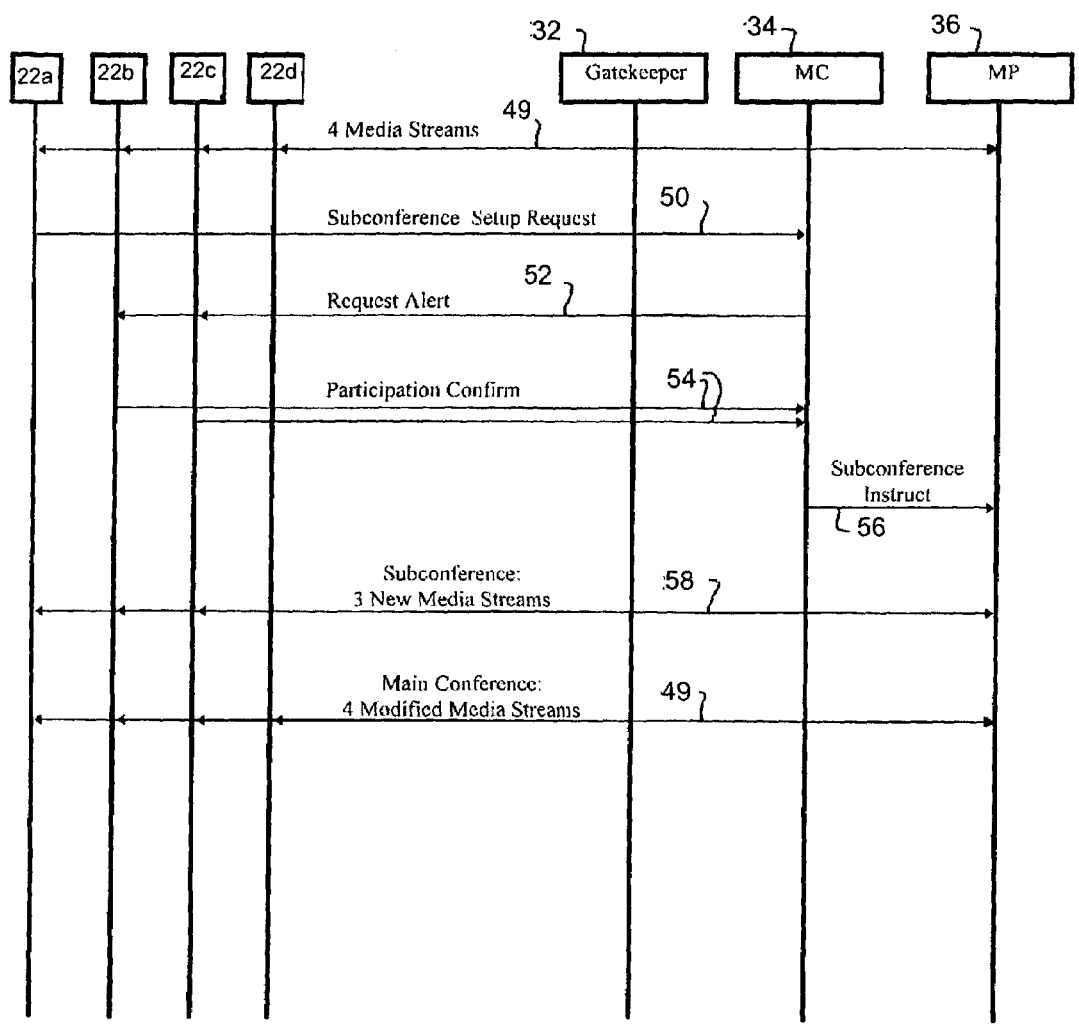

FIG. 3. is a schematic diagram of the message flows involved in the procedure for four terminals to join a conference in turn;

FIG. 4. is a schematic diagram of the message flows involved in the procedure for a user to initiate a subconference;

FIGS. 5A-5E are simplified views of screen displays seen by users during the initiation of a subconference.

DETAILED DESCRIPTION OF PREFERRED EMBODIMENTS

Figure 1:
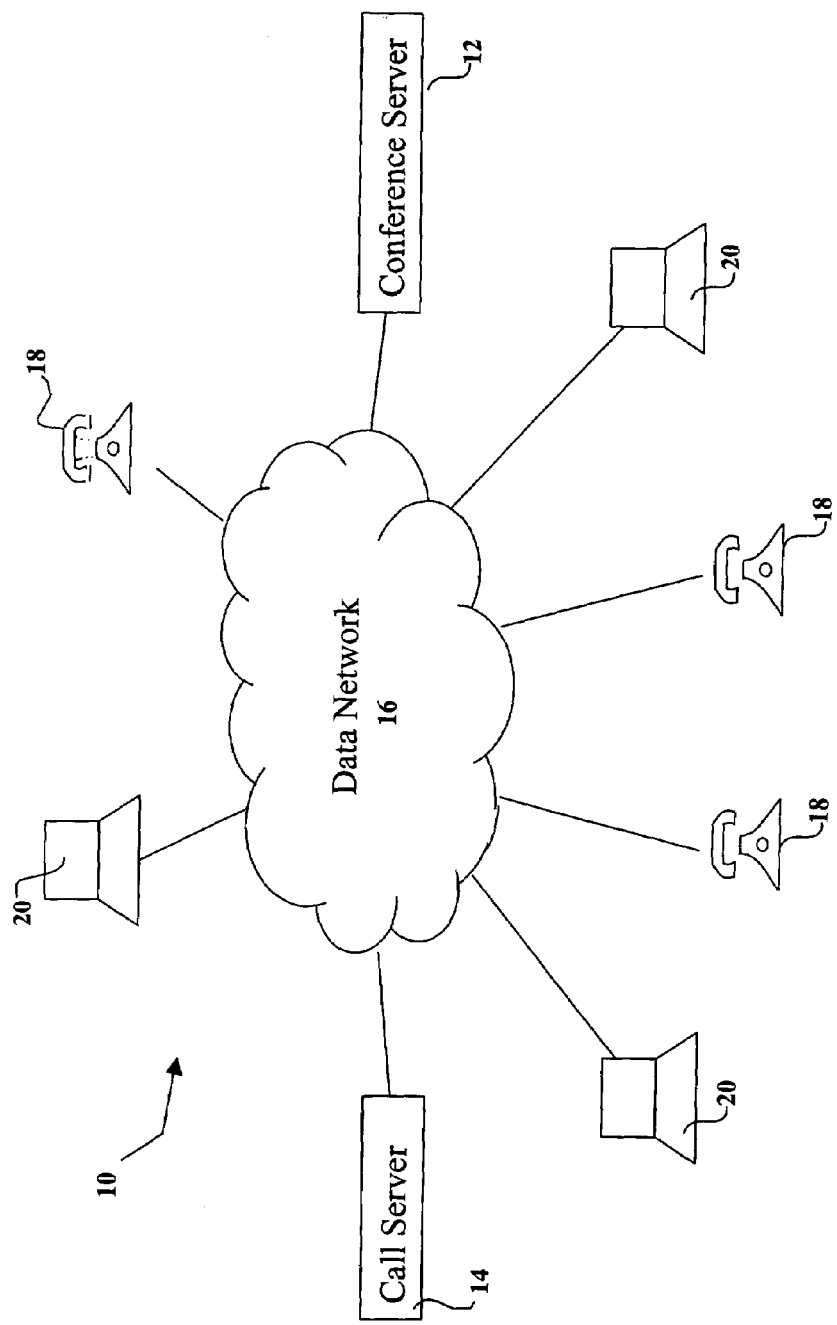
FIG. 1 is an overview of the entities involved in a multimedia conference.

FIG. 1 shows the general architecture of a conference system 10, comprising a conference server 12 and a call server 14 connected to a data network 16 which may be a local area network (LAN) or a wide area network (WAN).

In the following description, an embodiment of the invention employing the H.323 communications standard will be described, but it is to be understood that the invention is in no way limited to this implementation, which is given by way of example only.

The H.323 standard is described in the Recommendation H.323 document published by the Telecommunications Sector of the International Telecommunications Union (ITU-T) under the title "Packet Based Multimedia Communications Systems". This is an umbrella for a set of standards describing equipment, terminals and services for multimedia conferencing over networks such as the Internet.

A plurality of users are connected to the network 16 by means of telephone handsets 18 or multimedia terminals 20. The handsets 18 have a display allowing conference-related information to be presented to the user, and the multimedia terminals are PCs with video, audio and data capabilities. The handsets 18 and computer terminals 20 will be referred to collectively hereafter as "terminals". Such terminals are of course well known, and are not limited to the two types described above. For example, the terminal could be a personal digital assistant connected to the data network allowing media exchange over the network. Each terminal has, in addition to display capabilities, means for user input of commands, such as a telephone keypad, or a keyboard and mouse.

The call server 14 comprises hardware and software adapted to regulate communications between the parties aver the network. All terminals connecting to the network initially register with the call server.

The conference server 12 is a component having the necessary hardware and software to perform multimedia conferencing, including managing the media streams coming from the terminals, and mixing the streams which are output to the terminals.

Figure 2:
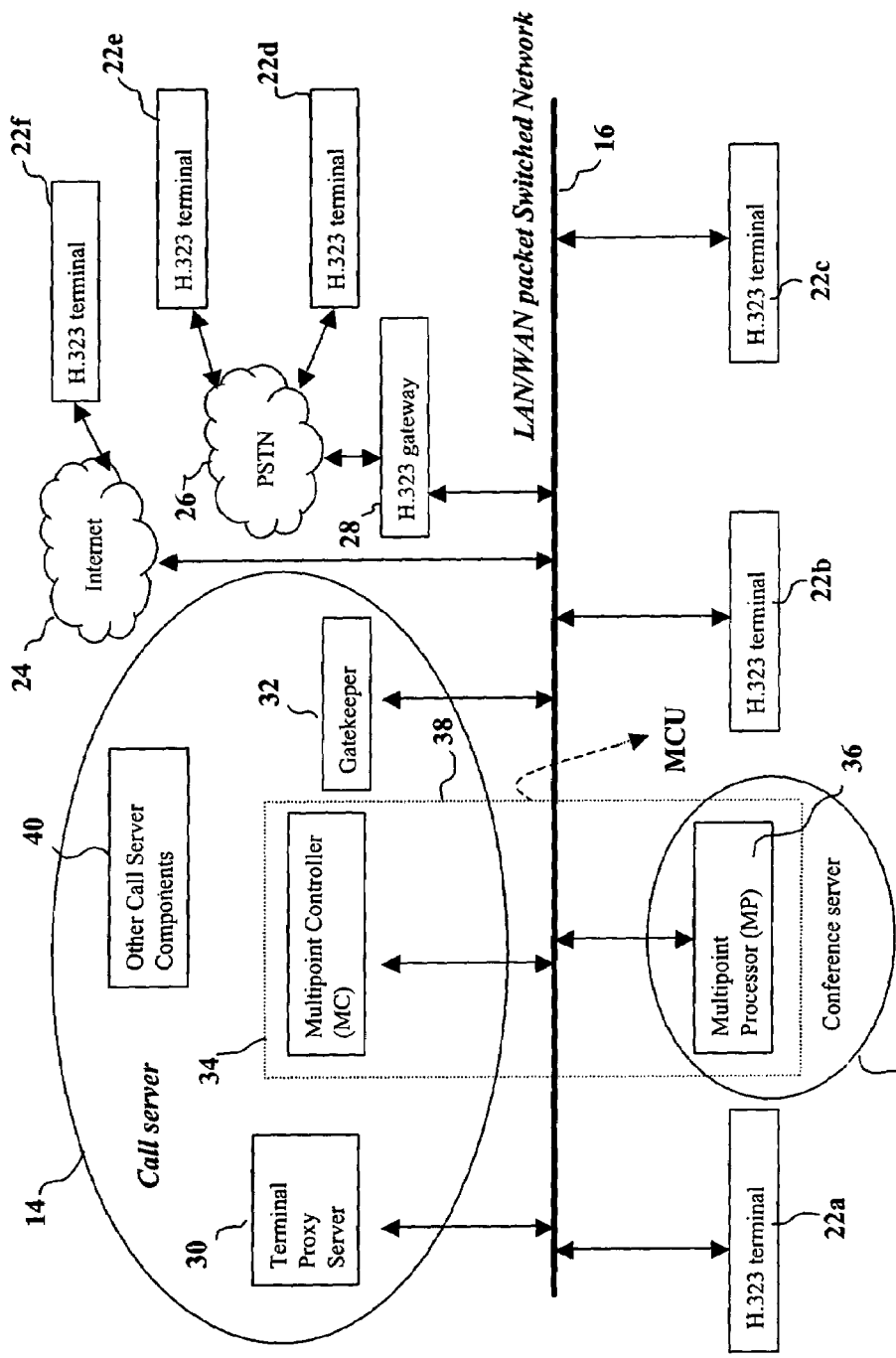
FIG. 2 is a more detailed diagram of the entities involved in a multimedia conference.

FIG. 2 shows a system generally equivalent to that of FIG. 1 but with greater detail. The data network 16 is shown as a common communication channel via which all other components interface directly or indirectly. A plurality of terminals 22a-22f (which may be telephones 18 or multimedia terminals 20 as in FIG. 1) are connected to the network.

The terminals 22 are identified as being H.323 terminals. H.323 terminals support the H.323 standard and can connect directly to the switched packet network 16, as in the case of terminals 22a, 22b and 22c, or connect via another switched packet network, such as terminal 22f which connects to the LAN/WAN network 16 via the Internet 24, or they may dial into the network indirectly (as in the case of terminals 22d and 22e) via the public switched telephone network (PSTN) 26. The PSTN 26 itself requires a H.323 gateway 28 to connect to the network 16.

Non-H.323 terminals could also connect via the PSTN 26 and gateway 28. Additionally, the call server software 14 contains a terminal proxy server 30, which is used to interface other non-H.323 based terminals to the call server 14. However, as such non-H.323 terminals would require that a proprietary signalling protocol be implemented in place of H.323 signalling, they have been omitted for simplicity.

The call server 14 also includes a gatekeeper component 32 and a multipoint controller (MC) 34.

The gatekeeper 32 is a H.323 entity which performs a number of call control services for the terminals 22a-22f, such as network address translation, bandwidth allocation, admission control, and accounting information.

The multipoint controller 34 provides the call control capability to negotiate with all terminals and achieve common levels of communication. The multipoint controller 34 also interfaces with the conference server 12.

The conference server 12 is a separate physical component in this implementation, and contains a further H.323 entity known as a multipoint processor (MP) 36. The multipoint processor 36 allows mixing, switching and other processing of media streams under the control of the multipoint controller 34. To achieve these functions, the conference server will include further components (not shown), such as signal processing means and a memory list unit for maintaining a listing of the conference participants, both under the control of a control unit.

The multipoint processor component communicates directly with the multipoint controller component. In the traditional H.323 architecture, the multipoint controller and multipoint processor combination are together referred to as the Multipoint Controller Unit (MCU) 38.

The call server 14 contains other conventional components 40 which are not particularly relevant to the present invention.

FIG. 3 shows the steps involved in the procedure for four terminals 22a-22d to join a conference in turn. The message flows are shown as horizontal lines between the terminals 22a-22d, gatekeeper 32, multipoint controller (MC) 34 and multipoint processor (MP) 36, each of which is represented by a heavy vertical line. The message flows occur in time sequence down the figure.

The first terminal 22a to join the conference bridge logs onto the call server, by means of a series of Request, Admission and Status (RAS) messages 42 to and from the gatekeeper 32, as defined in ITU-T Recommendation H.225.0. Gatekeeper 32 allocates bandwidth to the terminal and admits the terminal to the network.

Next, the call to the conference bridge is established with the multipoint controller 34 by means of call set-up messages 44 as defined in ITU-T Recommendation Q.931. The parameters of the call are then established by means of H.245 control messages 46, which establish terminal capabilities (e.g. codec types supported, media types being employed, etc.).

The multipoint controller 34 then instructs the multipoint processor 36 to initiate a conference (or if the terminal is joining an existing conference, to add the terminal to the conference). The H.323 standard does not specify any mandatory requirements for the communication between the multipoint controller and multipoint processor, and in most cases, proprietary signalling 48 will be employed for these communications. Alternatively, H.248 signalling can be used.

Once the multipoint processor 36 has added terminal 22a to a conference, an ongoing media stream 49 is established between the terminal 22a and the multipoint processor 36. This is a two way stream and may employ multiple media channels, such as audio, video, text and data or file transfer.

Additional terminals 22b, 22c, 22d joining the conference do so in the same manner as terminal 22a. When the four terminals have joined, multipoint processor 36 is communicating with each terminal via a 2-way multimedia stream 49.

Multipoint processor 36 receives the incoming multimedia stream 49 from each terminal 22a-22d and processes it by separating the various media channels from each terminal, and mixing the signals as appropriate to generate an outgoing multimedia stream to each terminal.

FIG. 4 shows the initiation of a subconference using the same type of schematic illustration for the messaging as in FIG. 3.

In FIG. 4, terminal 22a wishes to initiate a subconference with terminals 22b and 22c, but to exclude terminal 22d (and any other parties, not shown, who may be in the main conference).

The four terminals are participating in a main conference which employs a number of different media, as described above. Therefore multipoint processor (MP) 36 is involved in four two-way media streams 49. The user at terminal 22a sends a request 50 to multipoint controller 34 to invoke a subconference with terminals 22b and 22c.

The actual mechanism by which this is invoked uses a similar mechanism to the way some other supplementary services are implemented using the ITU-T H.450 standard. This generic functional protocol operates in conjunction with the call signalling protocol defined in H.225.

Although H.450 does not specify the subconference feature, H.450.x recommendations provide for a "facility" message to request or acknowledge a supplementary service. The facility message has a user-to-user information element which can carry one or more H.450 supplementary service APDUs (Application Protocol Data Units—these are sequences of data elements exchanged between peer application layer entities) to invoke the subconference.

The subconference request 50 includes not only an identification of the users which are intended to be included, but also information regarding the media types to be used in the subconference, and the degree of continued participation in the main conference during the subsistence of the subconference.

As an arbitrary example, assuming that the main conference media streams 49 are carrying voice, video, text, whiteboard and file transfer (FTP) data, the subconference request 50 may specify that the subconference is to be conducted in video and audio with a whiteboard capability. These video, audio and whiteboard communications between the subconference participants will therefore be hidden from the main conference participants.

The request 50 may further specify that the audio signal from the main conference is to be mixed in at a low volume level into the subconference media stream, to enable the subconference participants to monitor developments in the main conference. Furthermore, the request can specify the secrecy level of the existence of the subconference (i.e. the fact of the existence of the subconference may or may not be communicated to main conference participants).

For simplicity and ease of use, the selection of media types, secrecy levels, and continued level of participation in the main conference may be set as defaults, although the users might have the option of varying the default settings in a particular case.

The multipoint controller (MC) 34 notifies terminals 22*b* and 22*c* of the request 50 from terminal 22*a* by means of a request alert 52. Terminals 22*b* and 22*c* confirm or reject their participation by means of participation confirm messages 54. The multipoint controller 34 then generates a subconference instruct message 56 to the multipoint processor 36, based on the criteria specified in the subconference request 50 and the participation confirm responses 54 of terminals 22*b*, 22*c*.

In response, multipoint processor 36 creates and manages three new media streams 58 which constitute the signals within the subconference.

Multipoint processor 36 simultaneously modifies the processing of the existing four main conference media streams 49 to take account of the alterations to the participation levels of the parties in the various media types within the main conference.

Whereas the multipoint processor 36 maintains a memory listing of the conference participants for a conventional conference, and records the media types employed by the various participants, to enable the incoming media streams to be decoded and outgoing media streams generated, the invention necessitates that this functionality be expanded to take account of the dynamic changes to the participation levels of the users in the main conference, and to instigate the new media processing and participation recording of the subconference participants. This can be done within the existing memory structure employed by multipoint processor 36, or additional memory units dedicated to the subconference feature may be employed.

Each of the subconference users is sent a signal identifying the subconference participants on the user display. This information is also sent to the remaining main conference participants unless secrecy has been requested or set as default.

FIG. 5A shows a generic display 60 indicating to a user 62*h* the identities 62*a*-62*g* of other main conference participants, such as might be displayed on a multimedia terminal 20 of a conference participant. For each user 62*a*-62*h*, the type of terminal employed (telephone handset or multimedia) is identified by the icon representing the user.

In order to request a subconference, the requesting user 62*h* can select the desired participants 62*d*-62*g* with a mouse, and use a command provided in the conference software (e.g. on a menu or using a right mouse click) to call up a subconference request dialog box 64 (FIG. 5B).

On confirming the request with the request dialog button 66, a media type dialog box 68 is called up (FIG. 5C). The user selects the media types 70 to be used in the subconference and has the option of specifying more sophisticated options using the advanced button 72 to call up the advanced properties dialog box 74 (FIG. 5D).

In the advanced properties dialog box 74, the level of interaction with the main conference participants can be selected, such as by specifying that the subconference participants continue to receive audio and/or video, or that the video link should be maintained as full duplex (so that main conference participants are able to see subconference participants. It also allows audio volume levels to be adjusted, and the degree of secrecy of the existence of the subconference chosen. Further functionality can be given to the user depending on the level of control required.

When the requesting user completes the dialog boxes 64, 68, 74, the conferencing software on the requesting user's terminal generates a request message 50 (FIG. 4) based on the criteria specified and sends this to the multipoint controller 34 which responds by sending the request alert message 52 (FIG. 4) to the selected users nominated by the requesting user. The software at the terminals of the selected users responds to the receipt of the request alert by displaying a subconference requested dialog box 76 at these terminals (FIG. 5E). Selection of the accept 78 or ignore 80 buttons causes the terminal software to signal the response in a participation confirm message 54 (FIG. 4), following which the subconference is initiated as described herein.

The present invention is not confined to multimedia conferences. It also has applicability in simple telephone conferences where the users each have a handset having the capability of allowing users to select other users in the conference as part of a subconference request.

In any conference, a conference server of some sort (which may be a switchboard having conferencing facilities) will control the signal processing. The invention requires that the server have means for creating a virtual conference within the main conference. The server will generate a subconference memory list for use in managing the signals originating from the subconference users, and will have the capability of processing the signals from the subconference users differently to those from the main conference participants who are not in the subconference. Effectively, what is required of the server is that it the signal processing means can generate outgoing subconference signals which have information which is private to the subconference participants, i.e. which is not included in the main conference signals sent to users outside the subset of subconference participants.

What is claimed is:

1. A method of conferencing comprising the steps of:
   forming a main conference between a plurality of users,
   presenting at least one of said users in the main conference
      with a graphical list of the main conference participants,
   providing said user with an interface to interact with said
      graphical list of main conference participants, such that said user has an option to request a subconference with a subset of other users by selecting subconference participants from said graphical list using said interface, forming a subconference between said user and the subset of other users, maintaining private from the main conference at least some communication between the subset of users in the subconference during the subsistence of the subconference, wherein the users in the main conference are presented with said subconference list during the subsistence of the subconference, and presenting to said user a graphical list of the subset of users in the subconference, when the subconference is in progress.

2. A method of conferencing according to claim 1, wherein those users in the subconference are entirely isolated from participation in the main conference during the subsistence of the subconference.

3. A method of conferencing according to claim 1, wherein the users in the subconference are prevented from contributing to the main conference but are able to monitor communications in the main conference during the subsistence of the subconference.

4. A method of conferencing according to claim 1, wherein the main conference utilises a plurality of media types, users in the subconference utilise one or more of said media types, and users in the subconference can actively or passively participate in the main conference in at least one media type during the subsistence of the subconference.

5. A method of conferencing according to claim 1, wherein the users utilise a plurality of media types in the main conference and/or subconference, said media types being selected from the group consisting of video, audio and data signals.

6. A method of conferencing according to claim 5, wherein the media types utilised in the main conference include video and audio, and wherein the subconference utilises audio signals.

7. A method of conferencing according to claim 5, wherein the media types utilised in the main conference include audio and data, and wherein the subconference utilises data signals.

8. A method of conferencing according to claim 1, wherein the main conference is formed on a conference bridge to which each of the main conference users is connected.

9. A method according of conferencing to claim 1, wherein the subconference users remain connected to the bridge and the subconference is formed by creating a second conference on the bridge simultaneously with the main conference.

10. A method of conferencing according to claim 8, wherein the user(s) to whom the request is addressed have the option of accepting or refusing to join the subconference, and wherein such acceptance or rejection determines whether or not they remain as part of said subset.

11. A method of conferencing according to claim 1, wherein each user in the subconference is provided with the option to leave the subconference at any time during the subsistence of the subconference.

12. A method of conferencing according to claim 11, wherein users opting to leave the subconference are automatically returned to full participation in the main conference.

13. A method of conferencing according to claim 1, wherein users in the subconference are presented with the option of requesting one or more of the other subconference users to join a nested subconference within said initial subconference.

14. A method according to claim 1, wherein users in the subconference are presented with the option of requesting one or more of the other subconference users to leave said initial subconference and form a new subconference without rejoining the main conference.

15. A conferencing server comprising:
i) a main conference list memory unit for maintaining a main list of the users connected to the server as part of a conference,
ii) a main conference list manager for forwarding said main list of users to an endpoint of at least one of said users whereby said endpoint can graphically display said main list to said user,
iii) main signal processing means for receiving incoming signals from said users, processing said signals and generating outgoing signals to said users,
iv) a main control unit for controlling said main conference list memory unit and said main signal processing means,
v) a subconference list memory unit for maintaining a subconference list of a subset of said users, said subset being defined in response to subconference requests made by said user by interaction with said main list at said endpoint,
vi) a subconference list manager for forwarding said subconference list of users to said endpoint of said at least one user whereby said endpoint can graphically display said subconference list to said user,
vii) subconference signal processing means for generating outgoing signals to said subset of users, wherein the signals generated by said subconference signal processing means include subconference signals which are not included in the signals generated by said main signal processing means and sent to users outside said subset, and
viii) a subconference control unit for controlling said subconference list memory unit and said subconference signal processing means, wherein said subconference control unit includes means for forwarding said list of said subset of users to said subset of users and optionally to all users on the list maintained in the main conference list memory unit.

16. A conferencing server according to claim 15 wherein the main conference list memory unit and the subconference list memory unit are logical areas within a single memory unit.

17. A conferencing server according to claim 15 wherein the functions of the main signal processing means and of the subconference signal processing means are carried out by the same signal processing unit.

18. A conferencing server according to claim 17, wherein said signal processing unit is adapted to combine signals of different media types.

19. A conferencing server according to claim 18, wherein said media types are selected from video, audio and data.

20. A conferencing server according to claim 19, wherein said signal processing unit is dynamically programmable to generate outgoing signal streams containing an arbitrary combination of media types selected from the incoming signals from the users.

21. A conferencing server according to claim 15, wherein said main control unit includes means for forwarding said list of users in the conference to each of the users.

22. A conferencing system comprising a conferencing server according to claim 15, a call server connected to the conferencing server, and means for connecting users to the call server.

* * * * *